(12) United States Patent
Hertzman et al.

(10) Patent No.: US 7,474,760 B2
(45) Date of Patent: Jan. 6, 2009

(54) CONTACTLESS MEASURING OF POSITION AND ORIENTATION

(75) Inventors: Mikael Hertzman, Sollentuna (SE); Troy Lane Brown, Crystal Lake, IL (US)

(73) Assignee: Trimble AB, Danderyd (SE)

( * ) Notice: Subject to any disclaimer, the term of this patent is extended or adjusted under 35 U.S.C. 154(b) by 747 days.

(21) Appl. No.: 11/057,864

(22) Filed: Feb. 14, 2005

(65) Prior Publication Data
US 2005/0201610 A1    Sep. 15, 2005

Related U.S. Application Data

(63) Continuation of application No. 09/529,957, filed on Apr. 21, 2000, now abandoned.

(51) Int. Cl.
*G06K 9/00* (2006.01)
(52) U.S. Cl. .............................. 382/100; 702/33; 348/95
(58) Field of Classification Search ................. 382/100, 382/141, 142, 143, 144, 145, 146, 147, 151, 382/152; 702/33, 34, 35; 348/86, 92, 94, 348/95, 125, 135, 139; 235/470; 136/261; 356/237.1, 238.1
See application file for complete search history.

(56) References Cited

U.S. PATENT DOCUMENTS

| 4,044,372 | A | | 8/1977 | Weinstein |
| 4,044,377 | A | | 8/1977 | Bowerman |
| 4,396,945 | A | | 8/1983 | DiMatteo et al. |
| 4,764,668 | A | * | 8/1988 | Hayard ........................ 235/470 |
| 5,440,392 | A | | 8/1995 | Pettersen et al. |
| 5,617,335 | A | * | 4/1997 | Hashima et al. ......... 340/815.57 |
| 6,453,223 | B1 | * | 9/2002 | Kelly et al. .................... 701/28 |
| 6,556,722 | B1 | * | 4/2003 | Russell et al. ................ 382/291 |
| 2001/0010734 | A1 | * | 8/2001 | Gilliland ...................... 382/152 |
| 2005/0111726 | A1 | * | 5/2005 | Hackney et al. .............. 382/145 |

FOREIGN PATENT DOCUMENTS

| EP | 0 706 105 | 4/1996 |
| WO | WO 98/54593 | 12/1998 |

* cited by examiner

*Primary Examiner*—Anand Bhatnagar
(74) *Attorney, Agent, or Firm*—Dinsmore & Shohl LLP

(57) ABSTRACT

The invention relates to a method and device for contactless or touch-free measurement of a tool by imaging. A processor makes calculations based on image points on the tool, imaged onto an imaging area. Optics present the image of the image points on the tool on the imaging area. The processor calculates the momentary position and/or orientation along at least one axis of the tool making use of the image points. A number of measuring markers have predetermined mutual positions and are on the tool. Each measuring marker comprises at least one measuring point. At least one of the points is identifiable. Each measuring marker to be used as position and/or orientation indicator has a size making it restorable by the processor even if a part of it on the tool is obscured from the image area, for example by dust.

21 Claims, 4 Drawing Sheets

CONTACTLESS MEASURING OF POSITION AND ORIENTATION

CROSS REFERENCE TO RELATED APPLICATIONS

This application is a continuation of U.S. patent application Ser. No. 09/529,957 filed Apr. 21, 2000.

This invention relates to the contactless or touch-free measurement of position and orientation of a tool or accessory, for instance a blade of a road planner, skimmer shovel or the like, in relation to the machine provided with the tool.

Most often indications of the position and orientation of a tool are provided by sensors and encoders on the moving links and rotational parts of the machine which move the tool. However, wear, slippage, complicated installation or the like of the moving parts make the indicated results unreliable and also changeable with the passage of time.

DESCRIPTION OF RELATED ART

Therefore, a method is desired according to which a non-contacting and reliable measurement of the momentary position, orientation and movements of a tool could be provided.

A known method, disclosed in WO 96/22537, uses two cameras having frame grabbers to measure the distance to, and the speed of, a moving target. The mathematics of the triangulation calculation to provide the distance to a point of the target are analysed, as well as the target speed from consecutive distance measurements. However, it is assumed that the target is moved along a straight line from the cameras and only one point on the target is measured.

A calibration frame for a non-contact measurement systems is disclosed in WO 96/07869. At least two cameras are intended to view an object in order to determine the shape or other geometric properties of the object. A calibration frame having individually controllable light emitting diodes (LED) is arranged in view of the cameras. One LED at the time is switched on and the space co-ordinates for the LED in question is stored with the image co-ordinated data for that LED. This process is repeated for all the LEDs on the frame. Thereafter the computer in the system has all the data required to perform calibration of the measuring system so that measurements can be made. It is to be noted that a stationary system is disclosed in this patent application.

US 440 392 describes a system for point to point measurement of spatial co-ordinates of a touch probe provided with at least three point-sized light sources. The spatial direction to all the light sources of the touch probe are registered simultaneously on at least one 2D (two dimensional) matrix of photosensitive elements. Calculation is made of the spatial direction for each individual light source. Calculation of the spatial co-ordinates for the touch probe is then provided.

US 4,396,945 describes a method of determining the position and orientation of an object in space by use of two cameras which are turnable by servo control to be directed towards the object and record images light sources on the object. The intersection of the lines in space from the cameras towards the object is used to determine the position of each light source in space.

US 4,044,377 describes a target locator to measure the vertical and longitudinal distance from an industrial robot are by means of a closed circuit TV camera with a fixed focus lens. The robot arm is provided with a row of alternate black and white squares. This pattern is identified by the appearance of a burst of pulses in the video output during a horizontal scan across the uniform pattern. The vertical displacement of the target pattern is obtained by averaging the vertical deflection voltages, when the pattern is first acquired by a horizontal scan and when the pattern is just lost. The longitudinal distance to the target is obtained from the pulse repetition frequency from the horizontal scan across the pattern on the camera display.

U.S. Pat. No. 4,764,668 describes a system for performing a safe docking procedure in the clean space. Two pairs of bar codes are positioned along each one of two orthogonal lines going across an opening to a space ship. The position of the space ship and the orientation of it is determined by aid of the bar codes.

OBJECTS OF THE INVENTION

One object of the invention is to provide a method and system to make a reliable and exact measurement of the momentary position and orientation of a tool or accessory in relation to the body of a machine provided with the tool.

Another object of the invention is to provide a method and a system to make a contactless measurement of a tool or accessory in relation to the body of a machine.

Yet another object of the invention is to provide a method and a system to make exact measurement of the momentary position and orientation of a tool or accessory provided in a dirty and dirtying environment.

Still another object of the invention is to provide a method and a system which is easily installed to make reliable measurement of the momentary position and orientation of a tool or accessory in relation to the body of a machine.

Yet another object of the invention is to provide a method and a system to make a contactless measurement of a tool or accessory in relation to the body of a machine at short intervals in order to indicate the momentary speed and acceleration and the direction of them for the tool or accessory.

THE INVENTION

These objects are achieved by a method having the features in claim 1, and a device for performing the method is disclosed in claim 11. Further features and improvements of the invention, are disclosed in the dependent claims.

The invention relates to the technical field of contactless or touch-free measurement of a tool or accessories by means of at least one imaging area means and calculation indicating the position and/or orientation of the tool making use of image points on the imaging area means, based on the image points having predetermined mutual positions provided on the tool, imaged onto the imaging area means, and optics presenting the image points on the tool on the imaging area means, the image points being at least three visible within the field of view of the imaging area means and at least one being, distinctly identifiable.

The invention is characterized by, in order to measure the position and/or orientation of the tool, providing a number of measuring elements on the tool, each measuring element having a size large enough for making a reconstruction of its form and calculation of at least one image point on the tool related to the measuring element even though a part of it happens to be obscured by some obscuring object, for example dust.

Each marker has a two-dimensional shape and its point of balance, i.e. the centre-of-gravity of a disk having the same design and a uniform thickness, is detected and is used as its measuring point. Each measuring object could be derivable as a point of a marker positioned on the tool surface. Most of the markers could have the same shape, for instance circular, and at least one of the markers could have a shape different from the others, for instance a square, clearly distinguishable in the imaging areas, each said differently shaped marker having a predetermined known position on the tool and providing a reference point for determine shift position. The calculated consecutive positions in space of at least one of the differently shaped markers could be used as the basis for calculating the shift of the tool.

Preferably at least some of the measuring objects, called lined measuring objects, are positioned on at least one row; and that for each row at least one line in space going through the lined measuring objects for the row in question is determined. Several measuring objects are preferably present along each row. Calculation of at least one line per row is preferably made using at least three of them, but preferably several, on each image area having known mutual distances on the tool in order to determine the equation of the line and the positions of the measuring objects.

Using the modern computers nowadays having a great computing capacity the markers can be positioned also in an arbitrary design, but the best result will be provided if the markers are placed along lines extending from one short end side of the tool to the other. Thereby, each line can be viewed from each imaging area. Preferably, the rows are parallel to each other, because then the calculations of the rotations in different directions of the tool are easy to make and be programmed on a computer. However, it is also possible to have two lines crossing each other, for instance going diagonally over the tool and crossing each other in the middle between the short end sides, or the like.

Consecutive measurements of the markers could be provided, each measurement resulting in calculation of the tool 3D position, and further calculations are performed to calculate the 3D movements of tool from calculation to calculation and thereby to calculate at least one type of movement, such as shift, rotation etc.

At least two rows of markers are preferably provided on the tool, particularly when the tool can be moved both in all cartesian directions and turned around all the cartesian axes. A line in space is then calculated for each of the rows. Roll of the tool is derived by combining the information from the calculated 3D lines from at least two of the rows. The two rows can also be used to increase accuracy and extend the range of the coarse shift position determination. If the lines are parallel on the tool and the images of them are shown on a display, the operator of the working machine will have an intuitive sense of the orientation of the tool by looking at the display, since the lines will be angled to each other in relation to the rotation around a vertical axis. If the calculated points of balance also are shown along the lines then the operator will also have an intuitive sense of the roll of the tool, since the distance between the points on the lines will then be different in dependence of the distance to the tool at the viewed position.

SHORT DESCRIPTION OF THE FIGURES

The invention will now be described in more detail with reference to the accompanying drawings, in which FIG. 1 illustrates schematically a first embodiment of a device according to the invention;

DETAILED DESCRIPTION OF EMBODIMENTS

Figure 1:
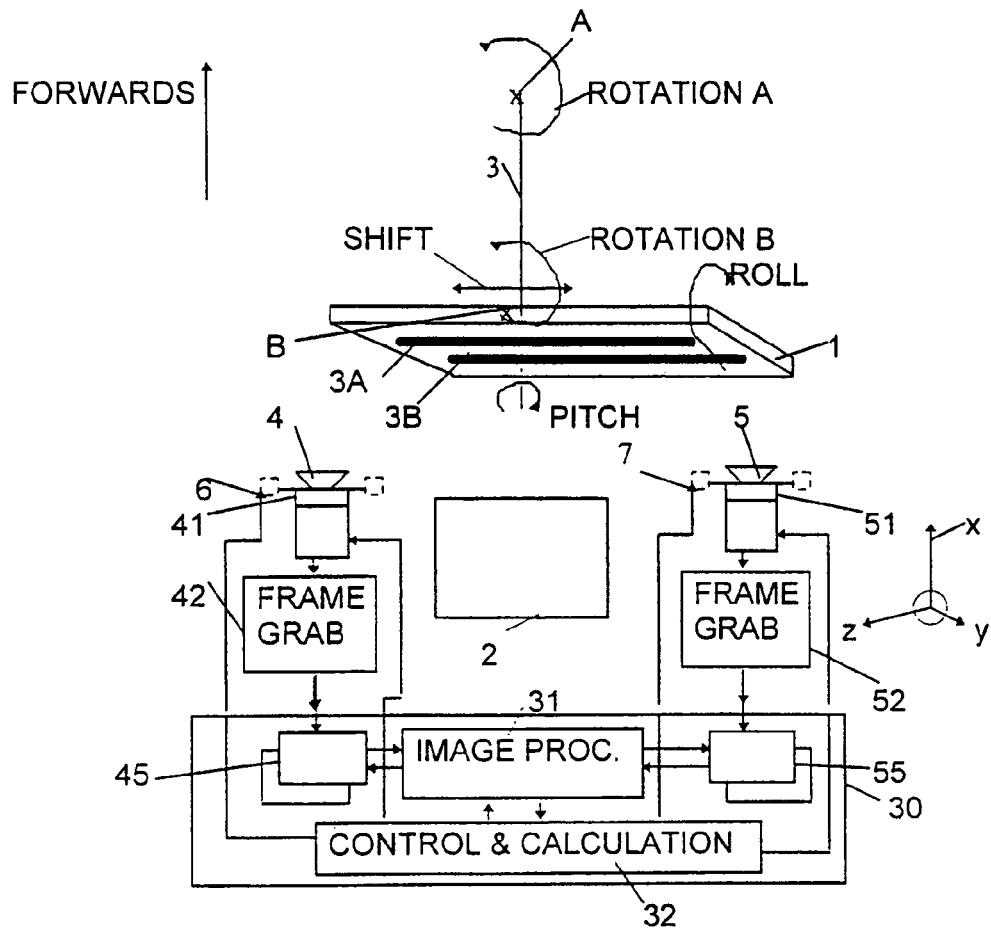

Referring to FIG. 1, a tool 1, illustrated as a road grader blade, is movable in relation to a machine, here illustrated as a control cabin 2 for the operator (not shown). The tool 1 is pivotably linked via, for example, a ball and socket joint to a bar 3, which in turn is pivotably linked to the machine. Thus, the tool 1 is pivotal around both the rotation points A and B at the end of the bar 3. The position (shift and height) of the tool and its orientation are to be determined.

At least one imaging area 4 (and 5), here represented by video cameras, are positioned in the vicinity of the control cabin 2. Preferably, two separate video cameras 4 and 5 are provided and positioned on each side of the cabin 2. The reason is that the tool 1 can be shifted so far that it comes outside the field of view of one of the cameras. Thus the problem which is solved by having two cameras is how to get a view of the tool all the time during a working operation.

According to the invention measuring points are provided on the blade. The points are preferably markers or code objects having sizes and shapes which are clearly detectable when making image processing which will be described later on in the description. It is to be noted that the sizes of the markers must be so large that the is shapes of them can be restored by the calculation of the image on each imaging area even though some dirt obscure a part of it. An image of a marker can also be obscured by some obscuring object positioned between the marker and the camera in question.

The markers are appropriately provided on at least one, preferably two code strips 3A, 3B adhered to the blade and are facing towards the imaging area or areas 4, 5, henceforth called cameras. Each strip is provided with the markers or code objects easily recognisable and distinguishable by the cameras.

Each of these code objects, below called markers, serve as measuring objects. However, measuring objects could also be easily distinguishable points on one and the same marker. If for instance a marker is a triangle, each apex of it could be used as a measuring object. The form of the marker is still reconstructable by the computation so that the distinguishable points can be reconstructed even if one of them is obscured by dirt. In a case like this it is the distinguishable points which are computed and not the point of balance. An unambiguous shift position can be obtained using markers of different shape and constellations.

If at least three or four points on a line in space (here three markers on one of the strips) having known mutual distances are recorded on an imaging area the equation of the line and the position of the points can be determined. If more than three points on a line (markers) are used, then a least square method could be used in order to determine the desired parameters in a more secure and exact way than with only three points, thus creating an over-determined system. An over-determinable system is preferred in a dirty and dirtying environment.

When two or more lines of markers are used, then further conditions could be used in order to enhance the estimations and to determine the position and orientation in space of the imaged object in a three-dimensional system. These mathematical conditions are well known for the person skilled in the art and are therefore not described in detail. They are described for instance in the textbook by Haralick and Shapiro "Computer and Robot Vision". vol II. The invention is a way to make practical use of such conditions in a contactless measurement of a tool. The position and orientation in space could also be provided with markers or code objects spread in a predetermined way over the surface. However, use of lines lead to equations easy to solve, particularly if they are parallel, and are therefore preferable. Using the mathematical conditions described in the textbook above it could be possible to make three-dimensional determinations having only four or five measuring objects on the tool having known mutual positions. As mentioned above, several measuring objects are preferably used in order to create an over-determined system.

Support for the roll-determination is also provided by using two or more lines of markers on the strips 3A and 3B. As mentioned above, the code on each strip should preferably have some redundancy, i.e. more markers to measure than what is strictly needed for computations to calculate the position of a line in a 3D-co-ordinate system, since it is not possible to avoid that at least some of the markers and/or code objects will become very dirty during operation. An active lighting unit 6, 7 can be provided in order to enhance the visibility of the markers on the coded strips.

Figure 2A:
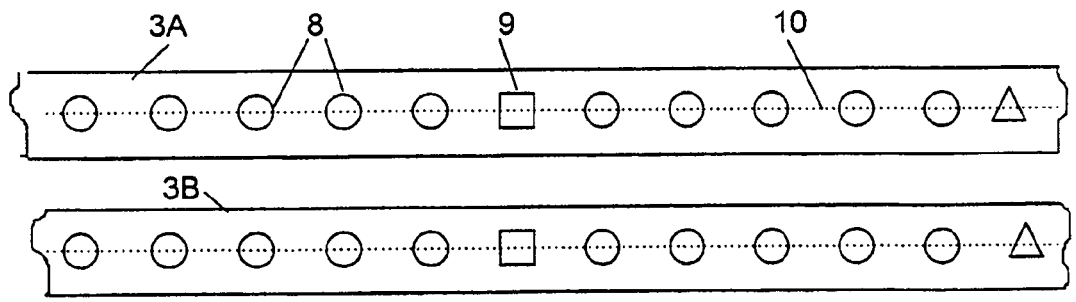
FIGS. 2A to 2F illustrate different kinds of code patterns to be provided onto the tool.
Figure 2B:
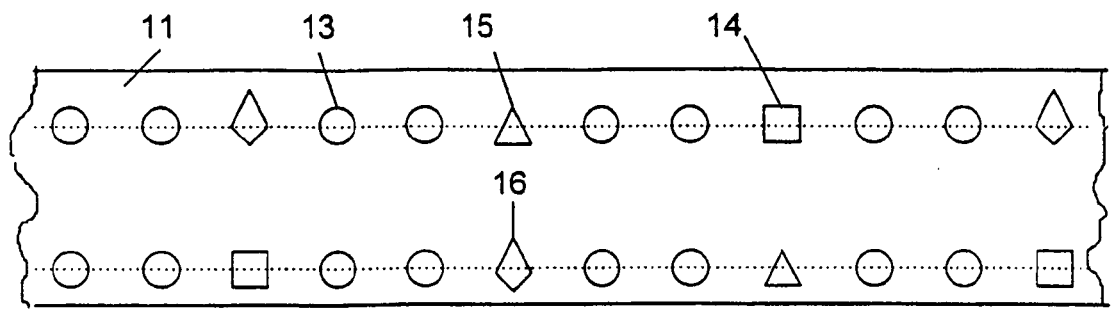
Figure 2C:
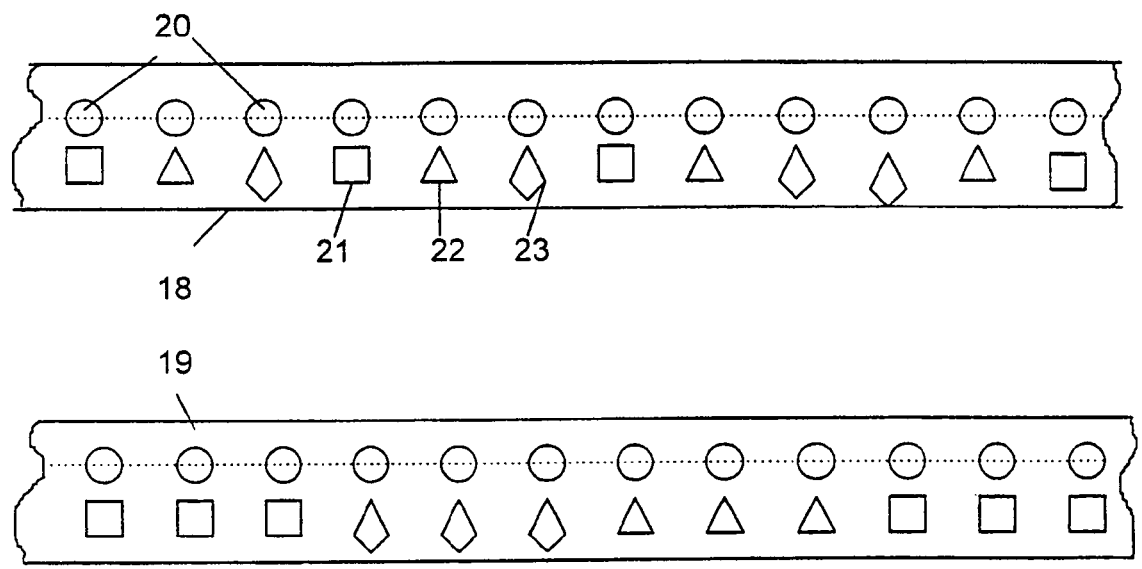

The redundancy can be provided by having the code pattern doubled or otherwise multiplied on each strip, as illustrated in the FIGS. 2A to 2C. The readability of the display areas can be checked by comparing the different parts of the image of the strips. If they are different as regards the pattern configuration, apart from size and inclination, then an indication is made to alarm the operator that the code is on the point of being too dirty. It is also possible and preferred to have a stored image of the patterns and to compare the pattern on the strip with the stored patterns in order to detect dirt on the code strips.

The displacements of the tool 1 can be large, particularly if the pivoting points are spaced a long distance apart from each other. Therefore, the distance from the cabin 2, and hence the cameras 4, 5, to the tool blade 1, or at least a part of it, can vary considerably, for instance 2 to 4 m. Shift and rotation around the point A can also cause the tool blade 1 to be moved out of the viewing imaging area of one of the cameras 4 or 5. Therefore, at least two cameras are preferably provided. The cameras are preferably provided at fixed locations and with fixed orientation on the wording machine in order to have as few movable parts as possible. However, if the tool is provided on for instance a bulldozer, having two degrees of freedom with high lifts then the camera(s) are preferably turnable around a substantially horizontal axis in order not to loose sight of the markers, i.e. the markers must not be moved up or down out of sight of the imaging area(s).

A bulldozer blade often has only a limited moving pattern and can often not be turned in every possible direction. If the number of degrees of freedom is limited the number of markers could be reduced and the calculation be simplified.

Since the instantaneous position of the blade is to be determined, a measuring frequency of between 1 to 50 Hz, preferably between 10 to 50 Hz, is desired. This means that the images of the coded strips are provided at the measuring frequency.

However, it is possible to determine shift position, rotation and roll at a lower frequency, i.e. making the more complicated calculations at greater intervals.

Different kinds of code design are illustrated on FIGS. 2A, 2B, 2C, 2D, 2E, 2F.

FIG. 2A shows two code strips, one above the other and both provided with circular markers 8 at precise mutual spaces. The size and the distance to them from each of the cameras 4 and 5 are adapted such that the circular markers cover such a number of pixels in the camera image, and that such a number of them are shown in the image, that the position and orientation of a line going through them can be determined with an acceptable accuracy. As an example, a suitable diameter or diagonal size is 3 cm and a suitable distance apart is 6 cm, the pixel density is such that each object covers at least 100 pixels, and the image size is chosen such that at least ten objects are shown in the image, at least when the blade 1 is parallel to the cabin 2.

FIG. 2A also illustrates that some of the markers could have another shape than the others. For example each fifth marker could be a square, as illustrated at 9, a triangle or the like instead of a circle 8. It is to be noted that the point of balance of each marker preferably should be placed on the same line 10 as the point of balance of the other objects. Having markers of different shapes makes it possible to exactly identify each marker on the blade in the image of each camera and hence the position of each of them.

FIG. 2B illustrates that the two parallel codes could have different shapes. In this way the positions of differently shaped markers could be uniquely determined by comparing the marker shapes one above the other in the two rows. It also illustrates that the rows of code markers could be provided on the same strip 11. In this embodiment each row has circles 13 and three differently shaped markers placed as the fifth object. These objects are a square 14, a triangle 15, a diamond 16 etc. However, the codes are differently ordered and permuted so that different kinds of the fifth element are placed one above the other on each position for a fifth element. In this way, using the sizes of the code elements given as an example above, it is possible to get nine unique half-meter positions, and hence a good resolution could be provided for a length of the tool 1 up to at least 5 m. This code has the advantage that all distances between the markers (i.e. their points of balance) are equal, even though they are differently shaped.

It is to be noted that the normal marker does not have to be a circle but another kind of object, for instance a polygon or the like. However, the markers preferably have a symmetric shape.

FIG. 2C illustrates that extra symbols could be provided at the side of the circular objects and shows two parallel strips 18 and 19 where each circle 20 has another kind of symbolic object below, such as in cyclic order a square 21, a triangle 22, a diamond 23 for the first three groups in the upper row, and groups of three symbolic objects of the same kind in cyclic order in the lower row. The reason for this is to create a uniquely determinable position for the markers when they are recorded. The forth group in the upper row has the symbolic object permuted in order to create a symbol order in which each combination of two symbol combinations of the upper and lower rows at the side of each other have different combinations. It is also possible to have symbols placed more sparcely in relation to the circular objects, for instance at each third such that the first three groups of symbolic objects will be enough for the marker rows.

The reason to have only circular markers above (or beneath) the symbolic objects or markers is that it is easier to determine the point of balance in a circle (or the same kind of objects) than in differently shaped object and also that the identification of the symbolic objects can be made in a simple way. They do not even need to have their points of balance positioned on the same line, because it is the circular markers which are the markers from which the lines in space should be derived. The differently shaped symbol markers only serve a position identification purpose.

Figure 2D:
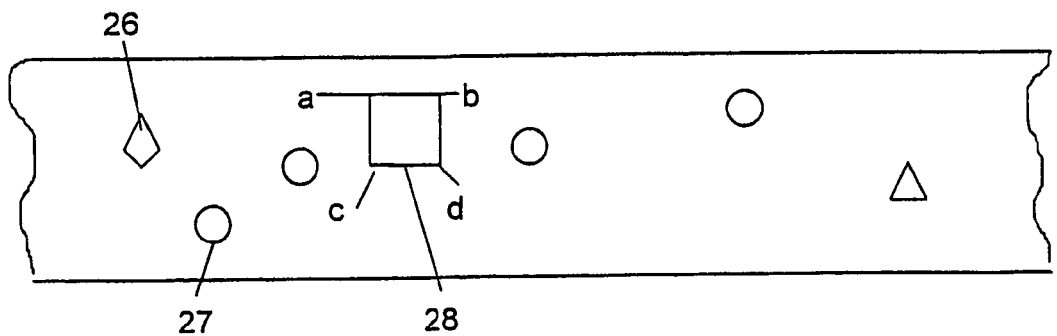

FIG. 2D illustrates that the markers or measuring objects need not be provided on lines and thus could be predetermined but arbitrary spread over the tool surface. The computers are so powerful nowadays that all the needed information can be derived without placing the markers in an orderly way. Measuring could be provided to the tool onto known predetermined positions at the manufacturing. The positions of the markers on the image areas are then stored. The processor making the calculations will be provided with a program directly calculating and presenting the position, orientation and moving direction of the tool.

The markers 26, 27, 28 need not have different shapes even though this is to be preferred. They need not either have the same size as illustrated at 28. Their different positions could be derivable from the particular pattern in which they are arranged on the tool. It is also illustrated that one marker could provide several measuring objects, such as the corners a, b, c, d of the square marker 28. It is to be noted that the corners could be restored even if all of them should happen to be obscured.

Figure 2E:
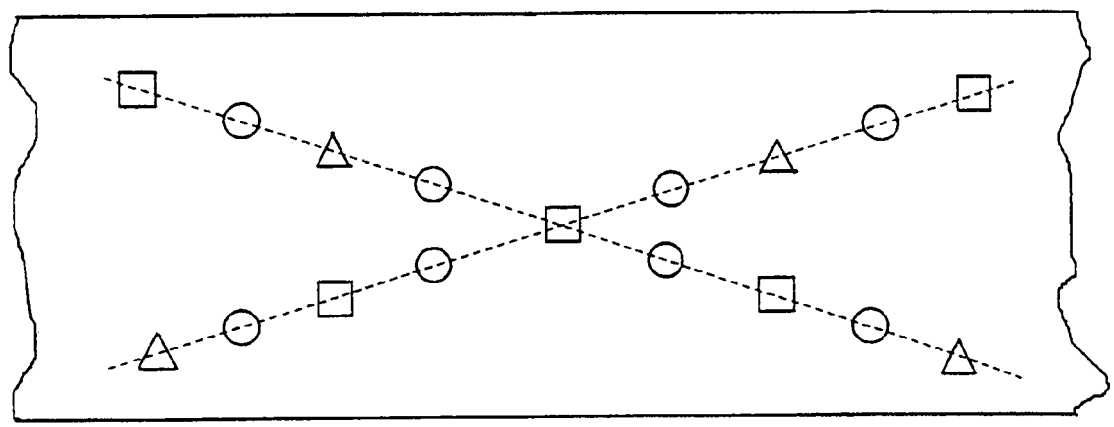
Figure 2F:
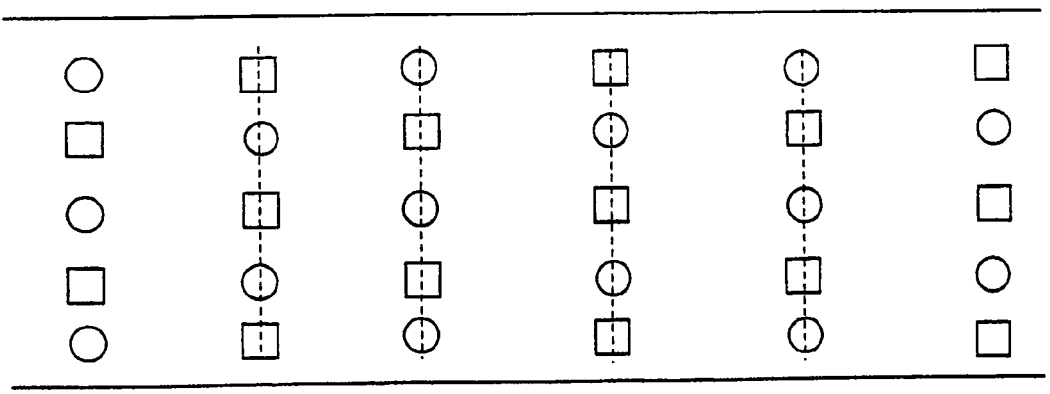

FIG. 2E illustrates that markers can be placed along at least two lines crossing each other, and FIG. 2F that markers can be placed along vertical lines. The lines are illustrated to be placed at such short distances that the cameras 4, 5 can have least one of those lines in their field of view.

The markers are preferably designed in a retro-reflective foil material. The background could be black and dull. This will minimise the disturbance from the light in the environment and also minimise the need of power supply for at least one active lighting unit 6, 7.

It is to be noted that the measuring device must be able to work perfectly in spite of varying environment light. Thus, the lighting unit or units 6, 7 have to provide a light strong enough to give a reflection from the markers above the level of the ambient light reflected by the tool blade 1 and its code strips. Instead of having reflective markers lights, such as light emitting diodes (LED), could be positioned on the tool blade and switched on during operation. However, this is not a preferred solution, even if it is possible, because of the vibration of the tool blade which makes the lighting circuitry sensitive and unreliable.

The lighting units 6, 7 could be positioned on the cabin 2. However, a preferred position, shown in FIG. 1, is near to the camera optics, for instance a fitting 6, 7 comprising a number of light diodes placed around each camera 4 and 5, respectively.

Each camera 4 and 5 could be provided with an array (matrix) of CCD-detectors. Each camera could also be provided with a spectral filter 41, 51, respectively, transmitting at least the same wavelengths as the lighting units 6 and 7 in order to minimise the influence of ambient light and to enhance the signal-to-noise ratio. The bandwidth of the filter 41, 51 is rather narrow, for example about 50 nm. An interference filter having a transmittance around the wavelength of the lighting units 6 and 7 could then be used. Also, the bandwidth of the lighting units 6, 7 and the filters 41, 51 is preferably within a wavelength range in which the solar light levels are rather low. For instance, the lighting units could comprise light diodes having a wavelength of 950 nm, i.e. within the near infrared range.

Each camera or two or more cameras in combination could be connected to at least one so called framegrabber 42, 52, respectively, for momentarily recording the images. The outputs from the framegrabbers are digitised representations of the images. The output from each framgrabber is stored at least momentarily in a store 45 or 55, respectively, in a calculating unit 30 for image processing, control and calculation. Each store could have a capacity to store more than one image at the time in order to ease the calculations, particularly since the movements of the line(s) in space should be derived.

The information in the images of interest to be used are the positions and shapes of the markers. Thus, the image parts comprising these objects are segmented out from the background, i.e. the background is discriminated. This is done by the image processor 30, 31. The respective points of balance of the markers are calculated. The background discrimination level is adapted between the exposures by striving to have the same amount of objects in the images for different exposures and to check that the shape of the markers is the right one (for instance circular or oval). This criterion is a minimisation of the shape factor.

In the embodiment shown in FIG. 1, by processing of the images from the cameras the computer calculates the orientation of the space lines going through the lines of markers, for example provided on code strips 2 and 3.

Since markers having different shapes than the others are used the positions of individual markers could be derived in relation to the tool blade 1. From the calculated momentary surface positions of the tool, surface rotation, pitch and roll of the blade are then calculated. The movement speed in different directions and rotations could be derived and hence tool positions can be predicted at least a short time in advance.

The image recordings and the calculations are performed at short intervals. The unit 30 simultaneously switches on the lighting units 6 and 7 and the electronic shutters (not shown) of the cameras for a suitable period of time, for instance in the order of $1/1000$ s, as illustrated by the block 32. The image processing starts directly, and a new image recording is done. It is possible to have more than one processing circuits working in parallel but time shifted in order to be able to have a close repetition frequency. Preferably the internal circuits in the cameras, for instance the integration time control and AGC, controls the exposure to be optimum.

In order to calculate the three-dimensional information derivable from the image data the computer program first transmits the pre-processed data to a calibrated co-ordinate system. Checkpoints could then be provided in stored tables. It is also possible to let the computer program make a homogenous matrix multiplication. An over-determined equation system is used for calculating the equations for the lines and the points of each line belonging to each individual code strip.

The equations are based on mere geometrical considerations known for the persons skilled in the art and are therefore not described in detail. Height, inclination and rotation are derived directly from the results of the calculations. Roll is derived by combining information from two rows of markers. Shift is determined by interpretation of the code such that a code point having a known position is related to its position on the blade. Such markers are thus provided on each code strip as described above.

The measures described above only provide the movements of the blade 1 in relation to the cabin 2. The speed, actual position and orientation of the vehicle having the tool blade 1 is measured in another conventional way.

Figure 3:
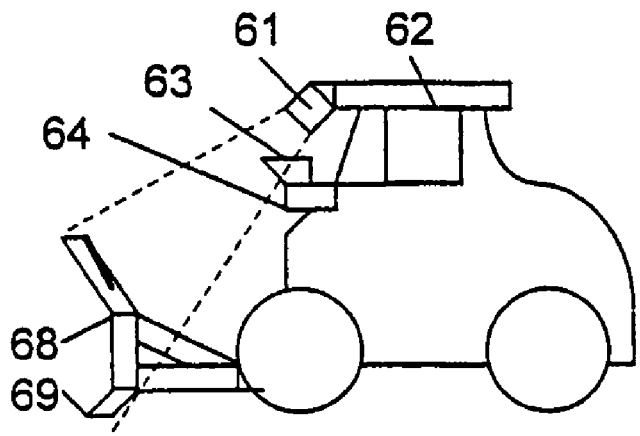
FIG. 3 illustrates schematically a second embodiment of a device according to the invention.

However, in accordance with a second embodiment of the invention, shown in FIG. 3, blade speed in relation to the ground is also derivable, at least when the blade is in contact with the ground. This embodiment also illustrate that it is possible to have only one camera 61, which then is placed on the front of the cabin 62. The camera 61 can have a field of view such that not only the blade but also the ground are recorded on its image plane, or alternatively have a part of its field of view by a divisional optics 63 directed towards the lower part of the tool. Preferably, the divisional optics is fixed and calibrated at the installation.

Figure 4:
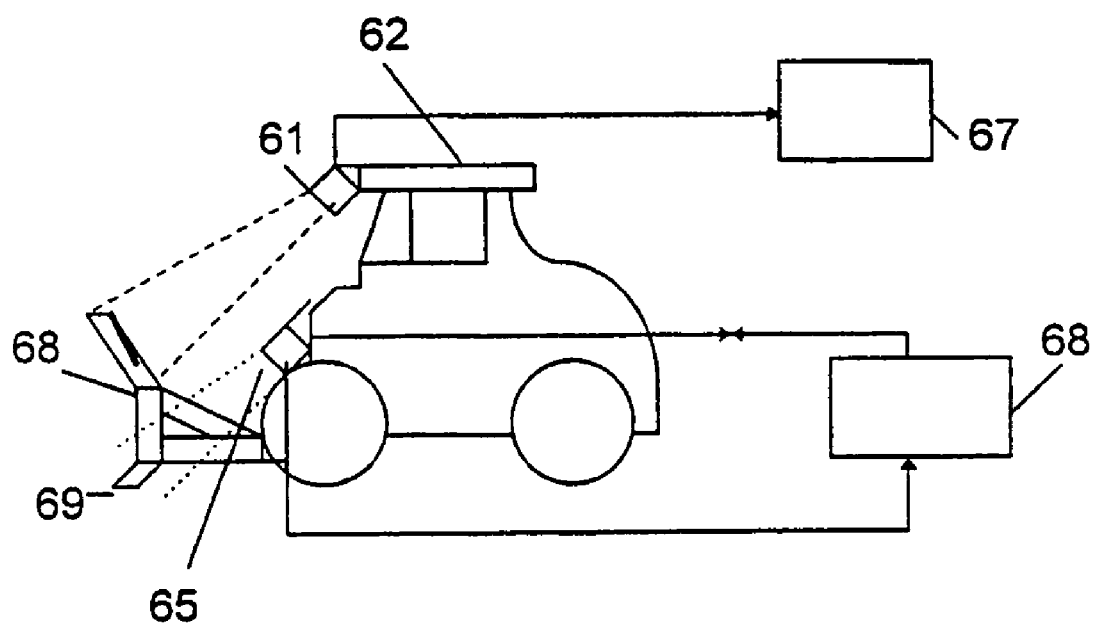
FIG. 4 illustrates schematically a third embodiment of a device according to the invention.

Alternatively and preferably, as shown in FIG. 4, besides the camera 61 a separate camera 65 is provided on the cabine 62 and directed such that both the blade and the ground are viewed and recorded. The image processing in a processing device 66 of the recorded image of the ground and at least a part of the ground demands a more powerful computation than the computation in the processing device 67 for the markers on the tool blade 68 using for instance correlation techniques.

Since the movements of the tool blade 1 in relation to the cabin 2 are monitored and calculated it is possible to servo control the direction of the divisional optics 63 of the divisional optics through a direction controllable mounting device 64 onto which the divisional optics are mounted, or the extra camera 65 from the processing device 66 such that the blade edge always lies at a pre-determined position in the part of the image or the image, respectively, showing the blade edge 69 together with the ground. The servo control feature is, however, expensive and therefore it is preferred to have the divisional optics or the extra camera in a fixed position.

While the invention has been described with reference to specific embodiments, it will be understood by those skilled in the art that various changes may be made and equivalents may be substituted for elements thereof and different features described for one embodiment could be adequate also in the other embodiments without departing from the true spirit and scope of the invention as it is stated in the claims on file. In addition, modifications may be made without departing from the essential teachings of the invention as apparent from the claims. For example at least one object position on the tool could be calculated making use of the image of the measuring objects on the image area(s) and be used to derive the 3D position of the tool and its 3D movement.

We claim:

1. A method for contactless or touch-free measurements of a tool of a machine or accessories by means of at least one imaging area means and calculation indicating the position and/or orientation of the tool relative to the body of the machine making use of image points on the imaging area means, based on the image points having predetermined mutual positions provided on the tool, imaged onto the imaging area means, and optics presenting the image points on the tool on the imaging area means, the image points being at least three visible within the field of view of the imaging area means at least one being distinctly identifiable, characterized by, in order to measure the position and/or orientation of the tool relative to the body of the machine, providing a number of measuring elements on the tool, each measuring element having a size large enough for making a reconstruction of its form and calculation of at least one image point on the tool related to the measuring element even though a part of it happens to be obscured.

2. Method according to claim 1, characterized in that at least some of the measuring elements, called lined measuring elements, are positioned on at lease one row; and that for each row at least one 3D line going through the lined measuring elements for the row in question is determined.

3. Method according to claim 1, characterized in that consecutive measurements of the measuring elements are provided, each measurement resulting in calculation of the 3D position and/or 3D orientation of the tool, and further calculations are performed to calculate the 3D movements of the tool from calculation to calculation and thereby to calculate at least one type of movement of the tool, such as shift, or rotation.

4. Method according to claim 3, characterized in that at least two rows of markers are provided on the tool, and that a line going through each row and/or the position of at least one measuring element point on each row are determined.

5. Method according to claim 4, characterized in that the rows of markers are parallel, the rows being either horizontal or vertical.

6. Method according to claim 4, characterized in that row of the tool is derived by combining the information regarding at least two of the rows.

7. Method according to claim 1, characterized in that most of the measuring elements are markers having the same shape, for instance circular, and that at least one of the markers has a shape different from the others, clearly distinguishable in the imaging area means, each said differently shaped marker having a predetermined known position on the tool and determining a reference point for determining shift position, and that a point or points on each marker are calculated to be used as the measuring point or points representing the marker.

8. Method according to claim 7, characterized in that, said markers are arranged in plurality of rows and that in order to have a uniquely determined position for each differently shaped marker, the differently shaped markers having relation to different rows have a different order and/or different configurations.

9. Method according to claim 1, characterized in that for each measuring element or marker its point of balance is detected and is used as a point representing the measured measuring element.

10. Device for contactless or touch-free measurement of a tool of a machine by means of imaging area means and processing means making calculations based on image point on the tool, imaged onto the imaging area means, and optics presenting the image of the image points on the tool on the imaging area means, the processing means being adapted to calculate the momentary position and/or orientation along at least one axis of the tool relative to the body of the machine making use of the image points, characterized by a number of measuring elements and/or markers having predetermined mutual positions and being provided on the tool, each measuring element and/or marker comprising at least one measuring point, and at least one of them being identifiable; each measuring element and/or marker to be used as position and/or orientation indicating means having a size making it restorable by the processing means even if a part of it on the tool is obscured for the image area means.

11. Device according to claim 10, characterized in that least some of the measuring elements and/or markers, called lined measuring elements, are positioned on at least one row; and that for each row the processing means determines at least one 3D line going through the lined measuring elements for the row in question and/or the equation of at least one line going through the measuring element or markers provided in the same row.

12. Device according to claim 10, characterized in that there are at least two rows of measuring elements or markers; and that the processing means is adapted to make calculations of a line through each row and/or the position of at least one measuring element or marker on each row.

13. Device accordingly to claim 12, characterized in that the rows are parallel to each other, either horizontally or vertically.

14. Device according to claim 12, characterized in that the rows of markers extend along a line going from one end side of the tool to the other and are angled in relation to each other.

15. Device accordingly to claim 10, characterized in that the processing means is adapted to make consecutive measurements to the measuring elements, each measurement resulting in the calculation of at least a line of the tool surface in space, and the processing means is adapted to calculate movements of the tool in space between calculations and thereby to calculate at least one type of movement of the tool, such as shift, or rotation.

16. Device according to claim 10, characterized in that at least most of the markers on the tool have the same shape, for instance circular, and that at least one marker is provided having a shape different from the others, clearly distinguishable in the imaging area(s), each said differently shaped marker having a predetermined known position on the tool and in relation to a predetermined constellation of the others.

17. Device according to claim 16, characterized in that most of the measuring elements are positioned in a plurality of rows, and that, in order to have a uniquely determinable position for each differently shaped marker, the markers having positions related to different rows have a different order and/or different configurations.

18. Device according to claim 10, characterized in that each measuring element provided in a row of measuring elements used for the measurement is a part of a marker having a two-dimensional shape.

19. Device according to claim 10, characterized in that the processing means detects the point of balance in a marker and uses it as one of the measuring points.

20. Device according to claim 10, characterized in that the processing means calculates shift of the tool by detecting different spatial positions of the differently shaped marker or markers in the consecutively made measurements.

21. Device according to claim 10, characterized in that the markers are reflective and provided on a dull background, and by lighting units illuminating the markers at least during the imaging of the imaging areas.

* * * * *

UNITED STATES PATENT AND TRADEMARK OFFICE
CERTIFICATE OF CORRECTION

PATENT NO. : 7,474,760 B2
APPLICATION NO. : 11/057864
DATED : January 6, 2009
INVENTOR(S) : Hertzman et al.

It is certified that error appears in the above-identified patent and that said Letters Patent is hereby corrected as shown below:

Col. 9, Line 50, Claim No. 2 "lease" should read --least--

Signed and Sealed this

Second Day of June, 2009

JOHN DOLL
*Acting Director of the United States Patent and Trademark Office*